United States Patent [19]

Kabe et al.

[11] Patent Number: 4,890,658
[45] Date of Patent: Jan. 2, 1990

[54] PNEUMATIC RADIAL TIRE

[75] Inventors: Kazuyuki Kabe, Tokyo; Masataka Koishi, Hiratsuka; Ken Takahashi, Atsugi, all of Japan

[73] Assignee: The Yokohama Rubber Co., Ltd., Tokyo, Japan

[21] Appl. No.: 252,721

[22] Filed: Oct. 3, 1988

Related U.S. Application Data

[63] Continuation-in-part of Ser. No. 139,560, Dec. 30, 1987, abandoned.

[30] Foreign Application Priority Data

Jan. 26, 1987 [JP] Japan ................................ 62-13959

[51] Int. Cl.$^4$ ......................... B60C 11/03; B60C 9/18
[52] U.S. Cl. .............................. 152/209 D; 152/531; 152/536
[58] Field of Search ............... 152/209 R, 209 D, 531, 152/536, 538, 454; D12/141, 142, 152

[56] References Cited

U.S. PATENT DOCUMENTS

| | | | |
|---|---|---|---|
| 3,677,319 | 7/1972 | Mirtain | 152/531 X |
| 4,214,618 | 7/1980 | Takigawa et al. | 152/209 R |
| 4,262,721 | 4/1981 | Tadokoro et al. | 152/209 R |
| 4,262,722 | 4/1981 | Takigawa et al. | 152/209 R |
| 4,480,671 | 11/1984 | Giron | 152/209 R |
| 4,633,926 | 1/1987 | Tamura | 152/209 R |
| 4,724,878 | 2/1988 | Kabe et al. | 152/454 X |

Primary Examiner—Raymond Hoch
Attorney, Agent, or Firm—Armstrong, Nikaido, Marmelstein, Kubovcik & Murray

[57] ABSTRACT

A radial tire with a split structure in the first belt layer provided with an organic fiber cord layer in the split structure and having a narrow groove extending in the circumferential direction of the tire and provided in each of both shoulder portions of the surface of a tread, wherein the narrow groove has a depth h determined in the radial direction of the tire, and a distance $d_1$ measured between the internal edge on the shoulder side of an opening portion of the narrow groove and the radially outermost surface of the shoulder portion as determined along a parallel line to the surface of the tread, and a distance $d_2$ measured between the internal wall surface on the shoulder side of the bottom of the narrow groove and the radially outermost surface of the shoulder portion as determined along a parallel line to the surface of the tread, wherein $d_1$ is less than 15 mm and is smaller than $d_2$, and a shape factor m defined by the following equation is 0.8 to 1.2:

$$m = \frac{d_2 - d_1}{h}.$$

5 Claims, 1 Drawing Sheet

PNEUMATIC RADIAL TIRE

This application is a continuation-in-part of application Ser. No. 139,560 filed Dec. 30, 1987 now abandoned.

BACKGROUND OF THE INVENTION

The present invention relates to a pneumatic radial tire. More particularly, the invention is concerned with a radial tire having a wandering preventing performance which is suitable for use on heavy vehicles, such as trucks and buses.

In recent years, radial tires have been used on heavy load vehicles, such as trucks and buses as well, because of excellent high-speed performance and wear resistance and low fuel consumption thereof. In the radial tires for use in such heavy-load vehicles, since the reinforcing belt layer of the tread portion is generally made of a metallic cord in order to withstand a heavy load applied thereto, the tread portion has a very high rigidity.

However, the high rigidity of the tread portion of the above-mentioned heavy-load radial tire is further increased as a result of the use of the radial tire in such a state that it is filled with a high-pressure air, which tends to cause a problem with respect to the occurrence of the so-called wandering phenomenon when the tire travels on a "rutted" road having recesses on its surface. That is, when the above-mentioned radial tire having a high rigidity is urged to pass over a rut during the travelling in the rut, an excessive lateral force is applied to the tire from the surface of the road, which leads to the failure in the control of a steering wheel, i.e., causes the wandering phenomenon.

Since camber thrust is a major causative factor of the wandering phenomenon, tires having a narrow groove provided in both the shoulder portions along the circumferential direction of the tire were proposed in order to prevent this phenomenon. In this expedient, the narrow groove is provided in order to decrease the shear rigidity of the shoulder portion relative to the lateral force, which relaxes the external force, thus contributing to the elimination of the failure in the control of a steering wheel.

However, the studies conducted by the present inventors revealed that the above-mentioned provision of a narrow groove in the shoulder portion tended to bring about the cracking at the bottom of the narrow groove along the circumferential direction of the tire when the narrow groove was located near the end portion of the shoulder. Further, it was found that, when the narrow groove was provided near the central portion of the tread for the purpose of preventing the occurrence of the above-mentioned cracking, the tread development width later to be described was substantially lowered, which led to another problem that the wear resistance was lowered.

SUMMARY OF THE INVENTION

An object of the present invention is to provide a pneumatic radial tire having a wandering phenomenon preventing performance which has a narrow groove provided in the shoulder portions along the circumferential direction of the tire.

Another object of the present invention is to provide a pneumatic radial tire suitable particularly for heavy duty applications which has improved wear resistance and resistance to the occurrence of the cracking in the narrow groove while enjoying an excellent wandering phenomenon preventing performance derived from the provision of a narrow groove in the shoulder portion.

In order to attain the above-mentioned objects, a fundamental structure of the pneumatic radial tire of the present invention comprises a reinforcing belt layer having a structure composed of at least three layers made of a metallic cord and disposed between a carcass and a tread, and a narrow groove extending in the circumferential direction of the tire which is provided in each of left and right shoulder portions of the surface of the tread, wherein among the layers constituting the reinforcing belt layer, a second reinforcing belt layer and a third reinforcing belt layer starting with the carcass towards the tread cross each other at a cord angle of 10° to 30° relative to the circumferential direction of the tire; and a first reinforcing belt layer starting with the carcass towards the tread has a cord angle of 40° to 75° relative to the circumferential direction of the tire and is split into left and right portions in the central region of a crown and provided with an organic fiber cord layer having a cord angle of 0° to 10° relative to the circumferential direction of the tire between the left and right split portions of the first reinforcing belt layer. In the above-mentioned fundamental structure, the narrow groove has a depth h as determined in the radial direction of the tire, and a distance $d_1$ measured between the internal edge on the shoulder side of an opening portion of the narrow groove and the radially outermost surface of the shoulder portion as determined along a parallel line to the surface of the tread, and a distance $d_2$ measured between the internal wall surface on the shoulder side of the bottom of the narrow groove and the radially outermost surface of the shoulder portion as determined along a parallel line to the surface of the tread, wherein $d_1$ is less than 15 mm ($d_1 < 15$ mm) and is smaller than $d_2$ ($d_1 < d_2$), and a shape factor m defined by the following equation is 0.8 to 1.2:

$$m = \frac{d_2 - d_1}{h} \tag{1}$$

When the above-mentioned requirements with respect to the structure of the narrow groove are met, the occurrence of the cracking at the bottom of the narrow groove can be suppressed without causing any lowering in the wear resistance of the tread portion while maintaining the wandering phenomenon preventing performance derived from the provision of the narrow groove.

DETAILED DESCRIPTION OF THE PREFERRED EMBODIMENTS

Figure 1:
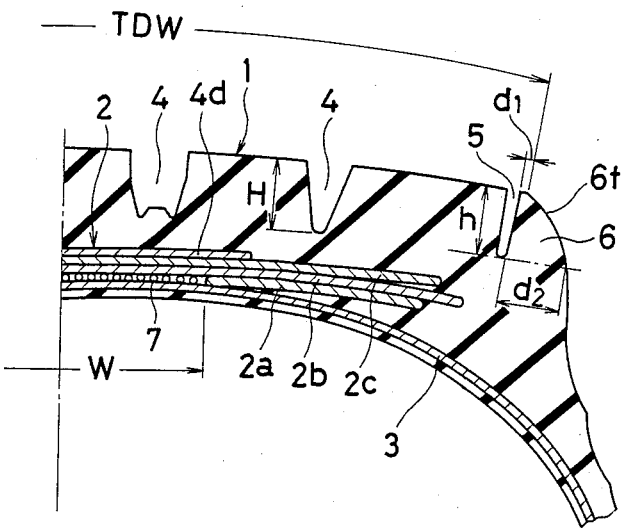
FIG. 1 is a sectional view of a half portion of a pneumatic radial tire embodying the present invention, showing essential parts in the tread portion of the tire.
Figure 2:
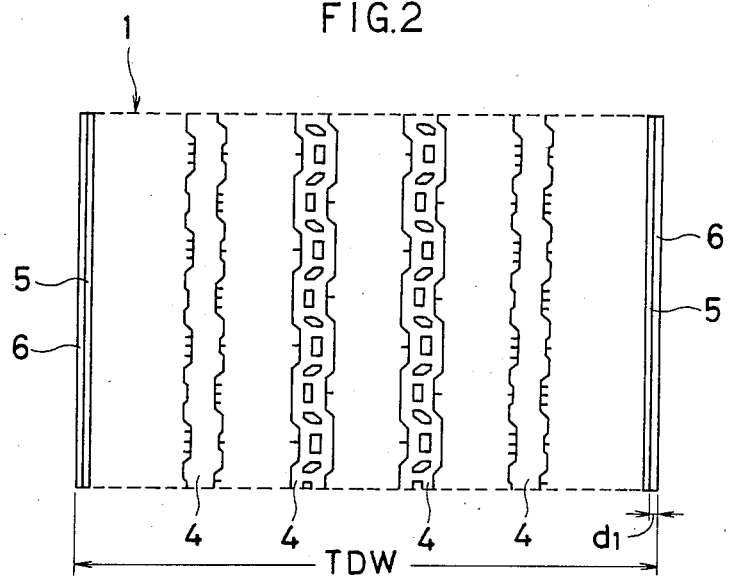
FIG. 2 is a plan view of the tread portion of the pneumatic radial tire shown in FIG. 1.

FIGS. 1 and 2 show an example of a heavy-duty radial tire according to the present invention. In these drawings, numeral 1 designates tread portion, numeral 2 a reinforcing belt circularly provided in the circumferential direction of the tread portion, and numeral 3 a carcass. The carcass 3 has a structure comprising one or more layers and is made of metallic cords, such as steel, or organic fiber cords provided at an angle of about 90° to the circumferential direction of the tire.

The contact area of the tread portion 1, i.e. the tread surface, is provided with a plurality of main grooves 4, ..., 4 (four main grooves in this example) in the circumferential direction of the tire and has a tread pattern based on a rib pattern formed thereon. Both shoulder portions of the tread portion 1 are each provided with a narrow groove 5 along the circumferential direction of the tire. A shoulder rib 6 is formed in the outside of the narrow groove 5. The outside surface 6f of the cross section of the shoulder rib 6 has a surface curved in a parabolic or arcuated form.

The above-described reinforcing belt layer 2 comprises at least three layers each made of a metallic cord such as a steel cord. In the example shown in the drawing, the reinforcing belt layer 2 comprises four layers, i.e., a first belt layer $2_a$, a second belt layer $2_b$, a third belt layer $2_c$, and a fourth belt layer $4_d$ starting with the carcass 3 towards the tread portion 1. Among them, the second belt layer $2_b$ and the third belt layer $2_c$ cross each other at a cord angle of 10° to 30°. The first belt layer $2_a$ has a cord angle of 40° to 75° relative to the circumferential direction of the tire which is larger than those of the above-described belt layers $2_b$ and $2_c$ and, at the same time, has a split structure wherein the central region is split into left and right portions in a width of W. The split left and right portions are disposed on left and right shoulder portions, respectively. An organic fiber cord layer 7 having the same belt width as the split width W is disposed between the left and right belt layers $2_a$ and $2_a$ so as to interpose between the carcass 3 and the second belt layer $2_b$.

In the radial tire of the present invention, as described above, a split structure is formed in the first belt layer $2_a$ for the purpose of lowering the cross-sectional bending rigidity in the radial direction of the tire in the central region of the crown. The lowering in the cross-sectional bending rigidity enables not only an improvement in the durability of the tire through dispersion of the stress concentrated in the central region of the crown attributed to the impact from the uneven portions during travelling on a rough road having unevennesses, such as stones or protrusions, in the end portion of the belt, but also the prevention of the occurrence of cracking in the narrow grooves 5 provided in the shoulder portions and growth of the cracking.

In order to attain the above-described function and effect, it is preferred that the above-described split width W be 25 to 45% of the tread development width TDW of the tread surface When the split width W is smaller than 25% of the tread development width TDW, it is difficult to attain the above-described stress relaxation effect due to the lowering in the cross-sectional bending rigidity in the radial direction of the central region of the crown. On the other hand, when the split width is larger than 45% of the tread development width, a shoulder portion reinforcing effect of the belt layer $2_a$ is excessively lowered, which brings about an irregular wear of the shoulder portions.

The organic fiber cord layer 7 provided in the above-described split portion serves to ensure the dimensional stability of the tread portion. That is, the split structure in the first belt layer $2_a$ brings about the above-described improvement in the durability with respect to the travelling on a rough road. However, this structure has a problem that since the belt layer reinforcing effect in the central region of the crown is lowered, the tread portion grows towards the outer periphery to bring about an increase in the diameter and finally causes the occurrence of the separation at both end portions of the belt layer. The provision of the above-described organic cord layer 7 brings about an effect of not only preventing the increase in the diameter in the central region of the crown but also preventing the occurrence of the separation at the end portion of the belt layer.

In order for the organic fiber cord layer 7 to exhibit the above-described function, it is necessary that the cord angle relative to the circumferential direction of the tire and the total tenacity of the cords be 0° to 10° and 240 kg/cm, respectively. The cord for the organic fiber cord layer 7 is preferably heat-shrinkable nylon cord, polyester cord, aromatic polyamide cord or the like.

The smaller the cord angle of the above-described organic cord layer, the better the results. It is most preferred that the cord angle of the organic fiber cord layer be substantially 0°. The total tenacity of the cords is preferably 240 kg/cm or more per unit width, more preferably 300 kg/cm or more per unit width. The term "total tenacity" used herein is intended to mean the product of the cord end count per unit width and the tenacity of the cord and represented by the following equation:

$$F = \Sigma n_i f_i$$

wherein F is the total tenacity; $n_i$ is the cord end count per unit width (cords/cm); and $f_i$ is the tensile strength of the organic fiber cord (kg).

With respect to the radial tire of the present invention having the above-mentioned tread structure, the width of the shoulder rib 6 relative to the tread development width TDW of the contact area is as follows. Specifically, the distance $d_1$ between the internal edge on the shoulder side of an opening portion of the narrow groove 5 and the outside surface of the shoulder portion as determined parallel to the surface of the tread is less than 15 mm. Further, the distance $d_1$ is smaller than the distance $d_2$ between the internal wall surface on the shoulder side of the bottom of the narrow groove 5 and the outside surface of the shoulder portion as determined parallel to the surface of the tread (i.e., $d_1 < d_2$) Moreover, the shape factor, m, defined by the above-mentioned equation (1) using the distances $d_1$ and $d_2$ and the depth h of the narrow groove 5 as determined in the radial direction of the tire is 0.8 to 1.2.

In the present invention, when the above-mentioned distance $d_1$ exceeds 15 mm, the effective width of the contact area of the tread surface is too small, which causes a deterioration of the wear resistance. A further increase in this distance $d_1$ leads to an insufficient decrease in the rigidity relative to the lateral force of the shoulder portion. This in turn lowers the wandering phenomenon preventing performance, which makes it impossible to attain the purpose of the present invention.

In the present invention, the distribution of the bending stress in the radial direction of the shoulder rib 6 can be approximated to the state of "a cantilever of uniform strength", so-called in the field of strength of materials, by setting the distance $d_1$ between the opening portion of the narrow groove and the outside surface of the shoulder portion and the distance $d_2$ between the bottom of the narrow groove and the outside surface of the shoulder portion so as to have the relationship, $d_1 < d_2$, and at the same time, setting the shape factor m defined by the above-mentioned equation (1) at 0.8 to 1.2. That is, the bending stress of the shoulder rib in the case where the lateral force is applied to the shoulder rib 6 can be substantially uniformly distributed from the tread surface to the bottom of the narrow groove. Therefore, approximating the shoulder rib 6 to the state of a cantilever of uniform strength leads to the relaxation of the concentration of the stress on the bottom of the narrow groove 5, which contributes to the prevention of the cracking caused at the bottom of the narrow groove along the circumferential direction of the tire.

In order to further approximate the shoulder rib to the state of a cantilever of uniform strength, it is most desirable that the shoulder rib be formed so that the cross section of the outside surface 6f of the shoulder rib has a surface curved in a parabolic form. However, the cross section of the outside surface 6f may have an arcuated shape or a taper shape as far as a state similar to the state of a cantilever of uniform strength can be attained.

When the shape factor m is less than 0.8, the stress tends to concentrate on the bottom of the narrow groove, which not only brings about the occurrence of the cracking along the circumferential direction of the tire but also deteriorates the wear resistance. On the other hand, when the shape factor m exceeds 1.2, the rigidity of the shoulder rib 6 is too large, which leads to the lowering in the wandering phenomenon preventing performance.

In the present invention, the cross-section of the bottom of the narrow groove may have any shape. However, in order to avoid the concentration of the stress, it is preferred that the cross-section of the bottom of the narrow groove have a round shape, such as U-shape. Further, the width of the narrow groove may have any value as far as the width provides a shape of a narrow groove and is preferably 1 to 5 mm, more preferably 2 to 3 mm. The depth h of the narrow groove with the wandering phenomenon preventing performance is preferably substantially equal to the depth H of the main groove 4, more preferably $0.7H < h < 1.0H$. A generally suitable depth h of the narrow groove is about 15 mm.

EXAMPLES

Five kinds of radial tires, i.e., tires of the present invention, comparative tires A, B and C, and a conventional tire, were manufactured. Each tire had a size of 10.00R20 14PR, a tread pattern shown in FIG. 2, and a tread development width TWD of the tread of 185 mm. The carcass layer of each tire had a single-layer structure composed of a steel cord layer. The structure of the belt layer and dimensions $d_1$, $d_2$ and h of the narrow grooves of the individual tires were varied. The structure of the belt layer was as follows, and the dimensions of the narrow grooves were as shown in Table 2.

Structure of belt layer

Tire of the present invention:
The belt layer comprised a steel cord belt layer and an organic fiber cord layer each shown in FIG. 1.
Steel cord belt layer: shown in Table 1
Organic fiber cord layer: nylon 1890D/2 (tensile strength: 40 kg), 8.4 cords×1 ply (provided in such a direction as will cross the second belt layer), F=336 kg/cm, and belt width W=60 mm Comparative tire A:
The belt structure was the same as that of the tire of the present invention, except that the first belt layer $2_a$ was not a split structure (that is, the organic cord layer was not provided).

Comparative tire B:
The belt structure was the same as that of the tire of the present invention.

Comparative tire C:
The belt structure was the same as that of the tire of the present invention.

Conventional tire
The belt structure was the same as that of Comparative tire A.

The above-described five kinds of radial tires were subjected to the following tests I, II, and III to evaluate the durability, growth of cracking, and wandering resistance. The results are shown in Table 2.

Test I (wear resistance evaluation test):

The depth (mm) of all the main grooves of each sample tire was measured before and after travelling of 50,000 km on an actual vehicle on an ordinary pavement. The amount of wear was determined by averaging the data on the difference between the determinations before and after the test travelling. The travelled distance (50,000 km) was divided by the amount of wear to determine the travelled distance per unit amount of wear (1 mm), thereby evaluating the wear resistance.

Table 2 shows the wear resistance of each tire expressed in terms of an index when the wear resistance of the tire of the present invention was assumed to be 100.

Test II (crack resstance evaluation test)

Tires to be measured were previously subjected to thermal aging in an oven at 100° C. for 2 weeks and then travelled for 100 hr by making use of an indoor drum tester having a diameter of 1707 mm, under conditions of a tire internal pressure of 7.25 kg/cm$^2$, a load of about 2200 kg, a speed of 45 km/hr, and a slip angle of ±2° (cycle variation), followed by observation of the cracks occurring at the bottoms of the narrow grooves. The whole periphery of the narrow grooves was checked for the occurrence of the cracking. The portion where the largest crack had occurred was visually found and transversely cut. The length of the largest crack was measured in terms of mm and used as an index of the crack resistance.

Test III (wandering resistance evaluation test)

The tire to be measured was mounted on a vehicle having an empty vehicle weight of 3910 kg (shaft weight of steering). Each of ten test drivers conducted a test in an empty vehicle state at a speed of 80 to 90 km/hr in a test course having ruts in which the vehicle was travelled straight within a rut and went in and out of the rut and the tire was intentionally dashed against the wall surface of the rut. The feeling of each test driver was marked on the basis of 10 when the level of a bias tire was assumed to be 6. The average value with respect to the ten drivers was expressed as the wandering phenomenon preventing performance.

In the above-described marking, the frequency of occurrence of wandering, the degree of movement of wandering, the speed of movement of wandering, the convergence of wandering, the response of the steering wheel, and the behavior of the vehicle with respect to the entry into the escape from the rut, etc. were evaluated.

TABLE 1

| | steel cord | end count of cords (cords/cm) | direction | angle | width |
|---|---|---|---|---|---|
| first belt layer | 3 (0.20) + 6 (0.38) | 4.4 | left downward | 60° | 50 mm |
| second belt layer | 3 (0.20) + 6 (0.38) | 5.6 | left downward | 18° | 175 mm |
| third belt layer | 3 (0.20) + 6 (0.38) | 5.6 | right downward | 18° | 160 mm |
| fourth belt layer | 3 (0.20) + 6 (0.38) | 3.6 | right downward | 18° | 75 mm |

TABLE 2

| | | structure | | | | test results | | |
|---|---|---|---|---|---|---|---|---|
| tire | belt Structure | dimensions of narrow groove (mm) | | | | test I (index) | test II (mm) | test III |
| | | h | $d_1$ | $d_2$ | m | | | |
| present invention | structure of the present invention | 15 | 1.5 | 14 | 0.83 | 100 | 0 | 6 |
| comp. tire A | conventional structure | 15 | 1.5 | 14 | 0.83 | 96 | 0.5 | 5 |
| comp. tire B | structure of the present invention | 15 | 2.0 | 9 | 0.46 | 102 | 2.0 | 6 |
| comp. tire C | structure of the present invention | 15 | 2.0 | 22 | 1.33 | 93 | 0 | 5 |
| conventional | conventional structure | 15 | 16.0 | 22 | 0.40 | 82 | 1.0 | 4 |

As is apparent from the foregoing description, according to the present invention, the improvement in the wear resistance and the crack resistance of the narrow grooves of a radial tire can be attained without spoiling the wandering phenomenon preventing performance derived from the provision of the narrow grooves through the formation of a split structure in the first belt layer, the provision of an organic fiber cord layer in the split portion, and the setting of the distance $d_1$ between the opening portion of the narrow groove provided in the shoulder portion and the outside surface of the shoulder portion and the distance $d_2$ between the bottom of the narrow groove provided in the shoulder portion and the outside surface of the shoulder portion so as to satisfy a particular requirement and setting of a shape factor m specified from the distances $d_1$ and $d_2$ and the depth of the groove h in a particular range.

What is claimed is:

1. A pneumatic radial tire comprising a carcass, a tread, a reinforcing belt layer having a structure composed of at least three metallic cord layers, and narrow grooves extending in the circumferential direction of the tire respectively provided on left and right shoulder portions of said tread surface, wherein among said layers constituting said reinforcing belt layer, a second reinforcing belt layer and a third reinforcing belt layer spaced outwardly from said carcass towards said tread cross each other at a cord angle of 10° to 30° relative to the circumferential direction of the tire; and a first reinforcing belt layer located outwardly adjacent said carcass towards said tread has a cord angle of 40° to 75° relative to the circumferential direction of the tire and is split into axially spaced apart left and right portions in the central region of a crown and provided with an organic fiber cord layer having a cord angle of 0° to 10° relative to the circumferential direction of the tire between said left and right split portions of said first reinforcing belt layer, said narrow groove having a depth h as determined in the radial direction of the tire, and a distance $d_1$ measured between the internal edge on said shoulder side of an opening portion of said narrow groove and the radially outermost surface of said shoulder portion as determined along a parallel line to the surface of said tread, and a distance $d_2$ measured between the internal wall surface on the shoulder side of the bottom of said narrow groove and the radially outermost surface of said shoulder portion as determined along a parallel line to the surface of said tread, wherein $d_1$ is less than 15 mm and is smaller than $d_2$, and a shape factor m defined by the following equation is 0.8 to 1.2:

$$m = \frac{d_2 - d_1}{h}.$$

2. A pneumatic radial tire according to claim 1, wherein said tread has a tread pattern formed based on a rib pattern comprising a plurality of main grooves extending in the circumferential direction of the tire.

3. A pneumatic radial tire according to claim 1, wherein the width of said narrow groove is 1 to 5 mm.

4. A pneumatic radial tire according to claim 2, wherein the width of said narrow groove is 1 to 5 mm.

5. A pneumatic radial tire according to claim 4, wherein the depth h of said narrow groove and the depth H of said main groove have the following relationship: $0.7H < h < 1.0H$.

* * * * *